(12) United States Patent
Lu et al.

(10) Patent No.: US 9,053,743 B2
(45) Date of Patent: Jun. 9, 2015

(54) SERVO MARGINALIZATION

(71) Applicant: LSI Corporation, San Jose, CA (US)

(72) Inventors: Lu Lu, San Jose, CA (US); Haitao Xia, San Jose, CA (US); Bruce A. Wilson, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/832,503

(22) Filed: Mar. 15, 2013

(65) Prior Publication Data

US 2014/0254041 A1 Sep. 11, 2014

Related U.S. Application Data

(60) Provisional application No. 61/776,077, filed on Mar. 11, 2013.

(51) Int. Cl.
*G11B 5/09* (2006.01)
*G11B 20/10* (2006.01)
*G11B 20/12* (2006.01)

(52) U.S. Cl.
CPC .... *G11B 20/10305* (2013.01); *G11B 20/10509* (2013.01); *G11B 20/10296* (2013.01); *G11B 20/10009* (2013.01); *G11B 2220/2516* (2013.01); *G11B 2020/1298* (2013.01)

(58) Field of Classification Search
None
See application file for complete search history.

(56) References Cited

U.S. PATENT DOCUMENTS

| | | | | |
|---|---|---|---|---|
| 5,490,091 A * | 2/1996 | Kogan et al. | | 702/180 |
| 5,825,318 A * | 10/1998 | Patapoutian et al. | | 341/131 |
| 5,961,658 A * | 10/1999 | Reed et al. | | 714/746 |
| 6,751,774 B2 * | 6/2004 | Aziz | | 714/792 |
| 7,009,792 B2 * | 3/2006 | Sakai et al. | | 360/39 |
| 7,155,660 B1 * | 12/2006 | Burd | | 714/795 |
| 7,231,001 B2 * | 6/2007 | Aziz | | 375/319 |
| 7,290,200 B2 * | 10/2007 | Ozdemir | | 714/795 |
| 7,502,427 B2 * | 3/2009 | Annampedu et al. | | 375/340 |
| 7,990,648 B1 * | 8/2011 | Wang | | 360/65 |
| 8,830,613 B2 * | 9/2014 | Lund et al. | | 360/45 |
| 2003/0002186 A1 * | 1/2003 | Bliss et al. | | 360/46 |
| 2008/0098288 A1 | 4/2008 | Yang | | |
| 2010/0067628 A1 * | 3/2010 | Buehner et al. | | 375/346 |
| 2011/0167246 A1 * | 7/2011 | Yang et al. | | 712/233 |
| 2013/0047053 A1 * | 2/2013 | Jin et al. | | 714/758 |
| 2013/0332790 A1 * | 12/2013 | Lu et al. | | 714/752 |

FOREIGN PATENT DOCUMENTS

EP 0803158 B1 3/2005

* cited by examiner

*Primary Examiner* — Dismery Mercedes
(74) *Attorney, Agent, or Firm* — Suiter Swantz pc llo

(57) ABSTRACT

Servo channel noise limits are defined through Viterbi decisions based on servo gate signals. Y values are used to produce a first Viterbi decision at each servo gate. Viterbi decisions and Y values are used to produce ideal Y values. Y values and ideal Y values are used to produce an error value which is adjusted by a noise factor based on estimated channel characteristics. The noise value is combined with Y values and used to produce a second Viterbi decision at each servo gate.

20 Claims, 3 Drawing Sheets

SERVO MARGINALIZATION

PRIORITY

The present application claims the benefit under 35 U.S.C. §119(e) of U.S. Provisional Application Ser. No. 61/776,077, filed Mar. 11, 2013, which is incorporated herein by reference.

BACKGROUND OF THE INVENTION

In a hard disk drive, noise in the servo channel introduces errors. Values from the servo channel are used to produce a Viterbi decision pertaining to error handling, but no function exists to test servo error marginalization. Testing servo error marginalization could be used to improve performance of the servo system.

Consequently, it would be advantageous if an apparatus existed that is suitable for measuring the error margin at various noise levels in a servo channel.

SUMMARY OF THE INVENTION

Accordingly, the present invention is directed to a novel method and apparatus for measuring the error margin at various noise levels in a servo channel.

In at least one embodiment of the present invention, servo channel noise limits are defined through Viterbi decisions based on servo gate signals. Y values are used to produce a first Viterbi decision at each servo gate. Viterbi decisions and Y values are used to produce ideal Y values. Y values and ideal Y values are used to produce an error value which is adjusted by a noise factor based on estimated channel characteristics. The noise value is combined with Y values and used to produce a second Viterbi decision at each servo gate. Servo marginalization measures the error margin for servo systems under various channel conditions.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
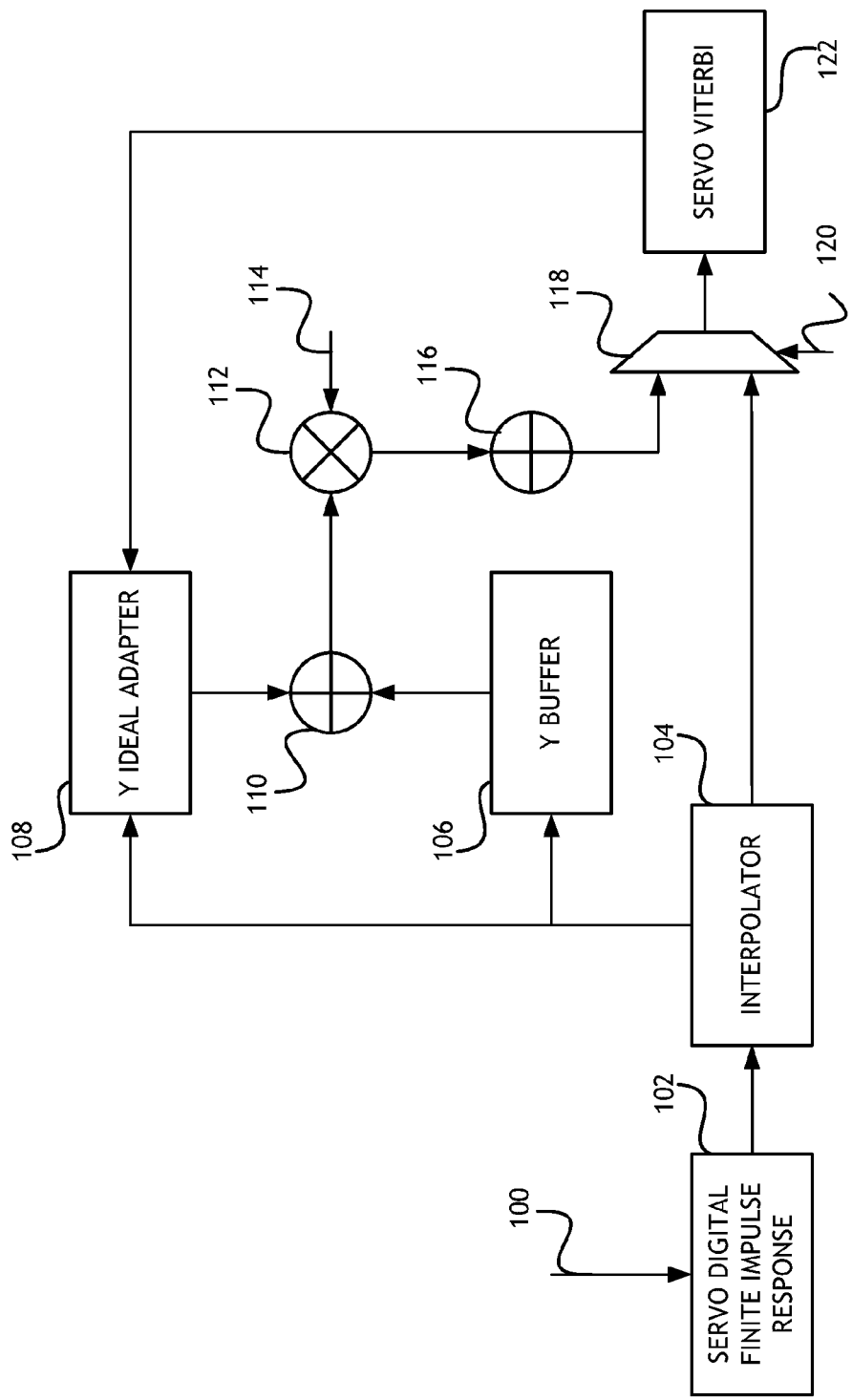
FIG. 1 shows a block diagram of a system for testing servo channel noise limits.

Referring to FIG. 1, a block diagram of a system for testing servo channel noise limits is shown. In at least one embodiment of the present invention, a servo digital finite impulse response filter 102 receives one or more analog-to-digital converter samples 100. A filtered signal is sent from the servo digital finite impulse response filter 102 to an interpolator 104. The interpolator 104 estimates values based on the filtered signal. The filtered, interpolated signal is send to a MUX 118. In at least one embodiment, the filtered, interpolated signal is also sent to a Y value buffer 106. In at least one embodiment, the filtered, interpolated signal is also sent to a Y value ideal adapter 108. An additive element 110 combines Y values from the Y value buffer 106 and the Y value ideal adapter 108 to produce an error value. The error value is adjusted be a noise multiplier 112. A noise control signal 114 determines a noise value produced by the noise multiplier 112. The noise value is combined by an additive element 116 with one or more Y values from the Y value buffer 106 to produce noisy Y values. The noisy Y values are sent to the MUX 118. The MUX 118 receives a mode control signal 120 to determine whether the MUX 118 sends the noisy Y values or the filtered, interpolated signal to a servo Viterbi element 122 that produces a Viterbi decision. In at least one embodiment, the Viterbi decision is sent to the Y value ideal adapter 108.

When the mode control signal 120 indicates that a marginalization mode is turned off, every servo gate produces a filtered, interpolated signal that is selected by the MUX 118 and sent to the servo Viterbi element 122 to produce a Viterbi decision. When the mode control signal 120 indicates that the marginalization mode is turned on, every servo gate produces a filtered, interpolated signal and one or more noisy Y values. The filtered, interpolated signal is selected by the MUX 118 and sent to the servo Viterbi element 122 to produce a first Viterbi decision. The first Viterbi decision is sent to the Y value ideal adapter 108 which uses the first Viterbi decision to produce ideal Y values. After some delay, the one or more noisy Y values are selected by the MUX 118 and sent to the servo Viterbi element 122 to produce a second, marginalized Viterbi decision. The second, marginalized Viterbi decision is also sent to the Y value ideal adapter 108 to produce ideal Y values. In at least one embodiment, the second, marginalized Viterbi decision is used for error marginalization and margin measurements under various channel conditions.

Figure 2:
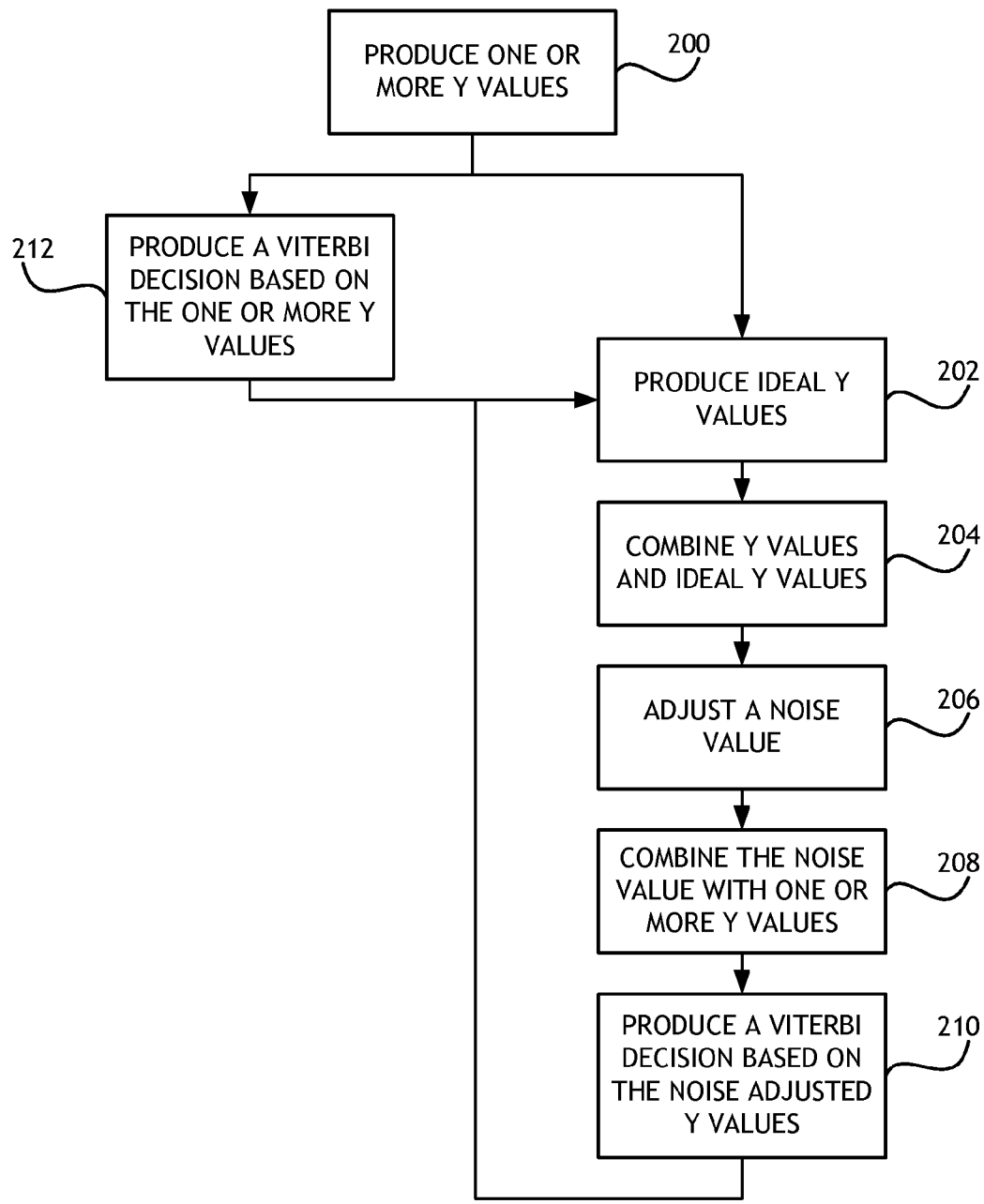
FIG. 2 shows a method for testing servo channel noise limits.

Referring to FIG. 2, a method for testing servo channel noise limits is shown. In at least one embodiment of the present invention, a servo gate produces 200 one or more Y values. In at least one embodiment, the Y values are produced through a digital finite impulse response filter and an interpolator. A Viterbi decision is produced 212 based on the Y values. In one embodiment, the Viterbi decision is used in subsequent iterations to produce 202 ideal Y values.

Ideal Y values are produced 202 from the Y values and from Viterbi decisions produced during previous iterations. The Y values and ideal Y values are combined 204 to produce an error value. In at least one embodiment, combining 204 the Y values and ideal Y values refers to finding a differential by subtracting the ideal Y values from the Y values.

In at least one embodiment of the present invention, the error value is adjusted 206 according to a noise control signal to produce a noise value. The noise value is combined 208 with one or more Y values. The noise adjusted Y values are then used to produce 210 a Viterbi decision. In one embodiment, the Viterbi decision is used in subsequent iterations to produce 202 ideal Y values.

Figure 3:
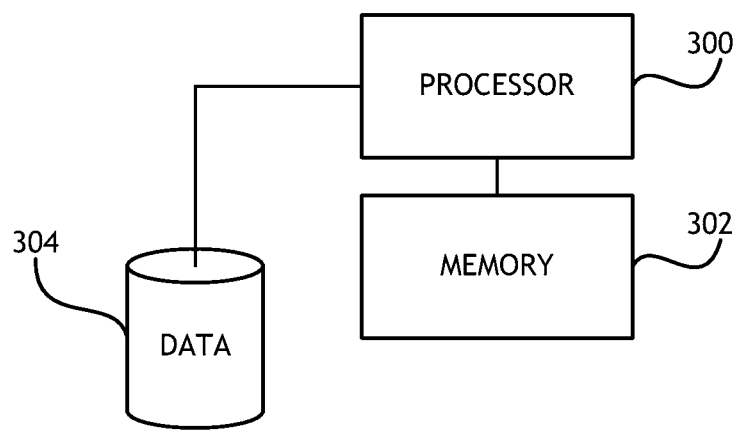
FIG. 3 shows a computer apparatus useful implementing embodiments of the present invention.

Referring to FIG. 3, a computer apparatus useful implementing embodiments of the present invention is shown. In at least one embodiment, the apparatus includes a processor 300, memory 302 used in storing and executing program code and a data store 304 with servos. The processor 300 receives analog-to-digital conversion samples based on servos in the data store 304. Based on those samples, the processor 300 produces one or more Y values. In one embodiment, Y values are stored in a Y value buffer in the memory 302. The processor 300 then produces a Viterbi decision based on the Y values. In one embodiment, the Viterbi decision is used in subsequent iterations to produce ideal Y values.

In at least one embodiment, the processor 300 also produces ideal Y values from the Y values and from Viterbi decisions produced during previous iterations. The processor 300 combines Y values and ideal Y values to produce an error value. In at least one embodiment, combining the Y values and ideal Y values refers to finding a differential by subtracting the ideal Y values from the Y values.

In at least one embodiment of the present invention, the processor 300 adjusts the error value according to a noise control signal to produce a noise value. The processor 300 combines the noise value with one or more Y values. The noise adjusted Y values are then used by the processor 300 to produce a Viterbi decision. In one embodiment, the Viterbi decision is used in subsequent iterations to produce ideal Y values.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A hard drive system comprising:
a processor;
a memory connected to the processor;
a data store comprising a servo connected to the processor; and
computer executable program code,
wherein the computer executable program code configures the processor to:
produce one or more Y values, wherein the one or more Y values comprise a servo channel noise component;
produce one or more ideal Y values;
combine the Y values and ideal Y values;
produce two or more Viterbi decisions;
use the two or more Viterbi decisions to produce one or more new ideal Y values; and
iteratively produce new ideal Y values based on previous Viterbi decisions.

2. The hard drive system of claim 1, wherein the computer executable program code further configured the processor to adjust the combined Y values and ideal Y values with a noise control signal to produce a noise value.

3. The hard drive system of claim 2, wherein combining the Y values and the ideal Y values comprises subtracting the ideal Y values from the Y values.

4. The hard drive system of claim 2, wherein the computer executable program code further configured the processor to add the noise value to the one or more Y values.

5. The hard drive system of claim 4, wherein at least one Viterbi decision of the two or more Viterbi decisions is based on the noise value added to the one or more Y values.

6. The hard drive system of claim 5, wherein at least one Viterbi decision of the two or more Viterbi decisions is based on the one or more Y values.

7. The hard drive system of claim 6, wherein the one or more ideal Y values is based on two or more Viterbi decisions.

8. A method for adding noise to a servo channel comprising:
producing one or more Y values based on a servo gate with a computer processor;
producing one or more ideal Y values with a computer processor;
combining the Y values and ideal Y values with a computer processor;
producing two or more Viterbi decisions based on the combined Y values and ideal Y values with a computer processor;
using the two or more Viterbi decisions to produce one or more new ideal Y values; and
iteratively producing new ideal Y values based on previous Viterbi decisions.

9. The method of claim 8, further comprising adjusting the combined Y values and ideal Y values with a noise control signal to produce a noise value.

10. The method of claim 9, wherein combining the Y values and the ideal Y values comprises subtracting the ideal Y values from the Y values.

11. The method of claim 9, further comprising adding the noise value to the one or more Y values.

12. The method of claim 11, wherein:
the combined Y values and ideal Y values comprise a noise factor based on the noise value; and
the noise factor is based on one or more channel characteristics.

13. The method of claim 8, further comprising producing two or more Viterbi decisions based on the one or more Y values.

14. The method of claim 13, wherein producing the one or more ideal Y values is based on two or more Viterbi decisions.

15. A computer apparatus comprising:
a processor; and
a memory connected to the processor configured to store computer executable program code,
wherein the processor is configured to:
receive one or more analog-to-digital signals, wherein the one or more analog-to-digital signals comprise a servo channel noise element;
produce one or more Y values based on the analog-to-digital signals;
produce one or more ideal Y values based on the Y values;
combine the Y values and ideal Y values;
produce two or more Viterbi decisions;
use the two or more Viterbi decisions to produce one or more new ideal Y values; and
iteratively produce new ideal Y values based on previous Viterbi decisions.

16. The computer apparatus of claim 15, wherein the processor is further configured to adjust the combined Y values and ideal Y values with a noise control signal to produce a noise value.

17. The computer apparatus of claim 16, wherein combining the Y values and the ideal Y values comprises subtracting the ideal Y values from the Y values.

18. The computer apparatus of claim 16, wherein the processor is further configured to add the noise value to the one or more Y values.

19. The computer apparatus of claim 18, wherein at least one Viterbi decision of the two or more Viterbi decisions is based on the noise value added to the one or more Y values.

20. The computer apparatus of claim 19, wherein at least one Viterbi decision of the two or more Viterbi decisions is based on the one or more Y values.

* * * * *